Oct. 31, 1961  N. E. BENSON  3,007,080
CONTROL APPARATUS INCLUDING CONDITION SENSING MEANS
Filed March 31, 1959
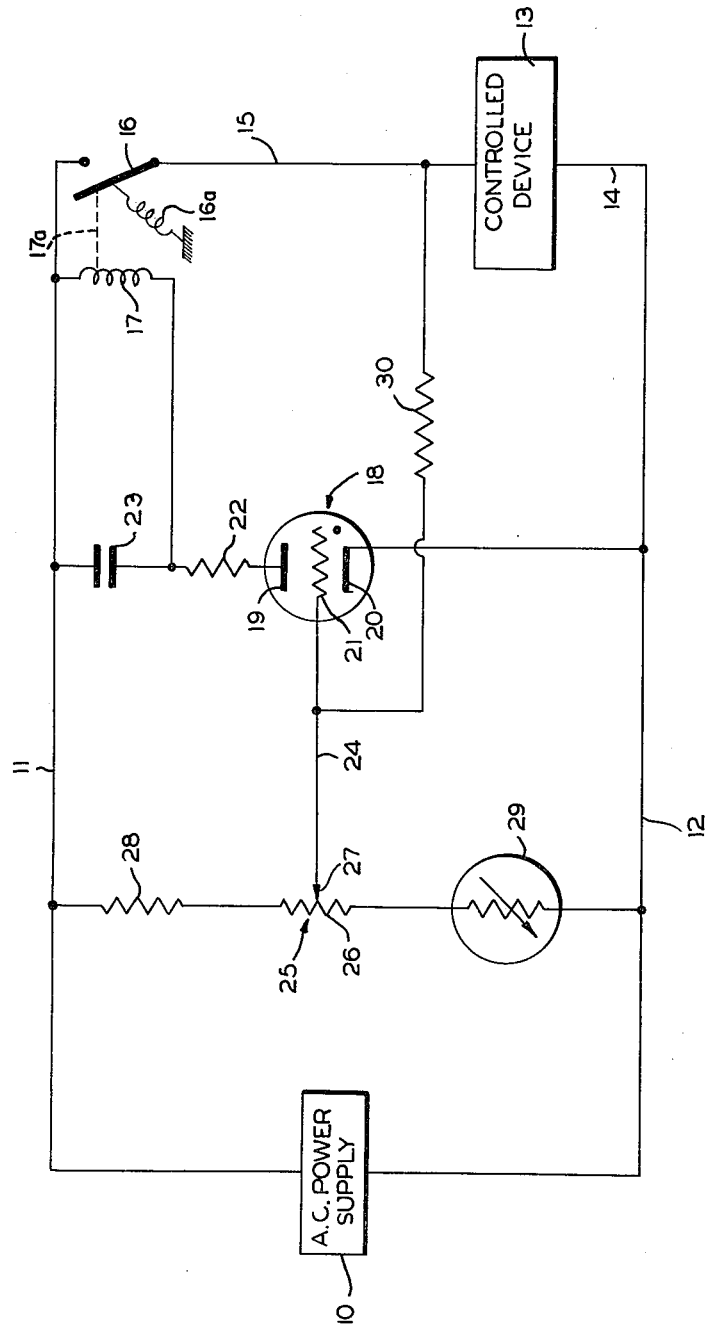
INVENTOR.
NORMAN E. BENSON
BY Shanley & O'Neil
ATTORNEY

United States Patent Office 3,007,080
Patented Oct. 31, 1961

3,007,080
CONTROL APPARATUS INCLUDING CONDITION SENSING MEANS
Norman E. Benson, Southport, Conn., assignor to The Acme Wire Company, a corporation of Connecticut
Filed Mar. 31, 1959, Ser. No. 803,227
7 Claims. (Cl. 315—159)

The invention relates to improvements on control apparatus and more particularly electrical apparatus operative responsively to a control signal.

Control apparatus operative responsively to a variable signal such as a signal originating with a condition sensor are widely used in industry. Prior control apparatus of this type present a continuing problem in effecting precise control in response to desired conditions. For example, when an operation is desired at the instant a condition being sensed reaches a critical value it frequently happens that a period of intermittent operation occurs before the desired operation is positively obtained due to fluctuation of the condition in the region of the critical value. Furthermore, in "on-off" type operations inherent properties of condition sensors and electrical circuit elements employed therewith cause the "on-off" operation to take place at a different sensed condition than that required for the "off-on" operation, the difference in sensed conditions may be referred to as an "operational differential." Prior attempts to eliminate operational differentials has sacrificed control to the extent that the controlling apparatus tends to hunt when the desired condition for operation is sensed causing an undesirable flutter in the system.

In other control systems operative responsively to a sensed condition an operational differential is desired. In such systems, prior to the present invention, inherent properties of condition sensors or other elements of the system are relied upon to establish an operational differential. In view of certain properties including non-uniform characteristics of the influencing inherent properties of condition sensors and the other elements of the system it has not been possible in the past to predetermine precisely particular operational differentials or to controllably vary operational differentials. It is therefore an object of the invention to provide a novel control apparatus which overcomes the foregoing problems.

Another object is to provide a novel control apparatus operable to precisely control a system in response to a variable sensed condition.

Still another object of the present invention is to provide a novel control apparatus for precisionally controlling a system responsively to a predetermined condition sensed by a condition sensor irrespective of inherent characteristics of the condition sensor or associated elements which would ordinarily present an operational differential.

Still another object is to provide a novel control apparatus including a condition sensor capable of establishing a controllable predetermined operational differential.

Still another object is to provide a novel control apparatus for positively initiating a desired operation precisely in response to a control value of a sensed condition irrespective of subsequent minute variations of the condition.

A still further object of the present invention is to provide simplified apparatus for controlling a lighting system.

Other objects and features of the present invention will appear more fully from the following detailed description considered in connection with the accompanying drawing which discloses a light-response system embodying the features of the present invention. It is to be expressly understood however that the drawing is designed for illustration only and not as a definition of the limits of the invention, reference for the latter purpose being had to the appended claims.

Referring to the drawing, a control apparatus embodying the principles of the present invention is shown therein including input means 10, such as an alternating current power supply, connected to power supply lines 11 and 12. Output means 13, comprising a device to be controlled, is connected across the power supply 10 by conductor 14 joined to the line 12 and by conductor 15 including switch coupling means 16 joined to the line 11, the coupling means 16 being biased to its normal position as indicated by spring 16a. The coupling means 16 is controlled by relay 17 (as indicated by the dash line 17a) in accordance with the state of a discharge device 18. Although the discharge device is shown as a cold cathode thyratron including an anode 19, a cathode 20 and a control element 21, it is to be expressly understood that other forms of discharge devices may be employed in connection with the present invention including solid state devices. The anode 19 is connected to the line 11 through an impedance 22 and the relay 17 with a smoothing capacitor 23 being connected across the relay, while the cathode 20 is directly connected to the line 12. The control element 21 is connected through lead 24 to bias establishing means 25 including impedance 26 and cooperating adjustable tap 27 connected to the lead 24. The impedance 26 is connected across the lines 11 and 12 in series with an impedance 28 connected to the line 11 and a condition sensing device 29 connected to the line 12. The condition sensing device 29 is shown in the form of a device presenting a resistance which varies responsively to changes in a condition being sensed and operates to apply a signal to the control element 21 of the discharge device. Although the disclosed form of the present invention incorporated a condition sensing device presenting a variable resistance it is to be understood that other forms of condition sensing devices may be employed including condition sensing devices such as photovoltaic cells which produce signals responsively to conditions or varying signals responsively to varying conditions. Moreover, the condition sensing device may or may not be incorporated in the bias means for the discharge device, that is the voltage divider including impedance 28, variable impedance 26 and the sensing device 29, but may be isolated from the bias means and connected to feed a signal to the control element of the discharge device in accordance with a sensed condition.

In operation of the apparatus thus far described, the adjustable tap 27 is positioned with respect to the impedance 26 to establish a predetermined bias on the discharge device 18, such as to bias the discharge device to a nonconducting state a predetermined degree beyond its conducting state, for example. Under these circumstances, when the condition being sensed attains a critical value such that resistance presented by the device 29 effects application of a signal on the control element 21 of sufficient magnitude to overcome the bias on the discharge device, the discharge device fires and the resulting current flow through the relay 17 closes the coupling switch 16 and connects the output means 13 across the power lines 11 and 12. The capacitor 23 functions to maintain the relay closed during intermittent nonconducting periods of the discharge device as a consequence of the alternating current power supply. In order to maintain application of power to the control device it is necessary that the signal applied on the control element 21 remain at a sufficient magnitude to overcome the bias on the discharge device since the thyratron discharge device is rendered nonconducting during negative half-cycles of the alternating current power supply. Consequently, should the condition being sensed attain a critical value to effect conduction of the discharge device and then vary from the critical value the discharge device may not be rendered conducting at the time of the next positive half-cycle of the power source. Thus, when the condition being sensed varies slightly in the region of the critical value, intermittent control results until the condition stabilizes at a value sufficient to effect firing of the discharge device. As mentioned above, one of the objects of the present invention is to provide a novel control apparatus which overcomes this disadvantage.

The control apparatus illustrated is capable of positively initiating a desired operation precisely in response to a critical value of a sensed condition irrespective of subsequent variations of the condition. This is accomplished by the provision of an impedance means such as resistor 30 connected between conductor 24 and lead 15 and thereby included, through the controlled device 13, in the control element-cathode circuit of the discharge device. The impedance 30 is also included in the circuit in such a manner so that the impedance is connected in the control element-anode circuit of the discharge device whenever the discharge device is in a state such that the coupling switch 16 is in closed position. Switching of the impedance 30 into the control element-anode circuit effects a change in the bias on the discharge device, as determined by the position of the adjustable tap 27, and the change in bias is employed to insure positive operation at the instant the condition being sensed attains a critical value. In particular such switching of impedance 30 changes the bias on the discharge device so that the discharge device will continue to conduct on alternate half-cycles of the power supply even though the condition being sensed may vary from the critical value in a direction and to such an extent that the signal applied to the control element would be of insufficient magnitude to render the discharge device conducting. The value of the impedance 30 determines the degree of bias change and its value establishes the sensitivity obtained, that is, the extent of condition variation that will not result in rendering the discharge device nonconducting. The concept of providing precise positive control by varying the bias responsively to a change in state may be applied to apparatus incorporating discharge devices other than thyratrons such as discharge devices of the type in which the signal on the control element directly determines nonconduction as well as conduction.

The feature provided by the present invention for varying the bias on the discharge device responsively to a change in state of the discharge device makes it possible to nullify or modify operational differentials inherent in condition sensing devices or other circuit elements or to establish predetermined operational differentials. With reference to the disclosed circuit, the condition sensing device 29 may provide a signal of sufficient magnitude to render the discharge device conducting upon the condition being sensed attaining a critical value upon varying in one direction, but upon the condition varying in the opposite direction a signal of the same magnitude may be produced at a value different from the critical value. This will result in the discharge device being rendered conducting and nonconducting at different values of the condition as the condition varies in one direction and then in the opposite direction. This "operational differential," which may result from inherent characteristics of circuit component in addition to the condition sensing device, such as relay 17 for example, may be eliminated by employing the impedance 30, of a value determined in accordance with the degree of operational differential present, connected in the manner shown in the drawing. With such arrangement it is possible to cause the discharge device to change from a first state to a second state upon the condition varying in one direction to a critical value and to cause the discharge device to change from the second state to the first state upon the condition varying in the other direction to the same critical value. It is also contemplated by the present invention to establish predetermined operational differentials by the feature of controlling the bias on the discharge device. Since the value of impedance 30 determines the bias change it is possible within practical limits determined by apparatus characteristics to establish any desired differential between conducting and nonconducting times of the discharge device when the condition sensor is subjected to the same level of the condition.

Where the impedance 30 functions to nullify inherent operational differentials or to establish predetermined operational differentials it also functions in the manner described above to insure precise, positive control.

The various features of the present invention will be more fully understood by considering operation of the disclosed control apparatus in a particular environment such as the control of a lighting system responsively to ambient light conditions in which the controlled device 13 comprises a lighting system and the condition sensor responds to ambient light conditions. In this use, the tap 27 is adjusted to bias the discharge tube nonconducting and so that a signal of predetermined magnitude need be applied to the control element to render the discharge device conducting, the signal of predetermined magnitude being the signal resulting from the condition sensor 29 in response to a critical value of ambient light condition when energization of the light system is desired. Thus, during daylight when the ambient light is greater than the critical value the discharge device is nonconducting and the coupling switch 16 is open, as shown. However, as darkness approaches and the critical value of ambient light is reached, the condition sensor presents a high resistance so that a signal of the predetermined magnitude is applied to the control element and the discharge device fires on the next positive half-cycle of the alternating current supply, effecting closure of coupling switch 16 and energization of the lighting system from the power source. At the instant the discharge device fires the impedance 30 is connected in the control element-anode circuit so that the equivalent impedance of the arm of the voltage divider including impedance 28 is reduced relative to its equivalent impedance during nonconducting periods of the discharge device. This equivalent impedance change increases the bias on the discharge device so that the discharge device remains in conduction even though the ambient light intensity may increase from the critical value. Thus intermittent application of power to the lighting system, which would ordinarily be caused by slight intensity variations of the ambient light in the region of the critical value, is eliminated and precise energization of the lighting system at the time the ambient light reaches the critical value is positively obtained. As daylight approaches the resistance presented by the condition sensor 29 decreases in accordance with increases in ambient light intensity, however as the critical value of ambient light is again reached the discharge device will continue to conduct since the discharge device is biased at a higher level due to the switched position of impedance 30. Consequently, the discharge device is rendered nonconducting when the sensor 29 responds to an intensity value of ambient light greater than the critical value. At the instant the discharge device becomes nonconducting, power is removed from the lighting system and the impedance 30 is switched out of the control element-anode circuit to return the discharge device to its normal bias and thereby prevent intermittent operation during deenergization of the lighting system.

In an apparatus without means for varying the bias on the discharge device responsively to a change in its state, fluttering would occur at the time the lighting system is energized and deenergized and in addition the inherent "operational differential" of the condition sensing device would result in the lighting system being deenergized at a value of light intensity lower than the critical value. The latter result would not be desirable and the feature of employing the switching impedance 30 not only makes it possible to eliminate the inherent operational differential but to establish a predetermined operational differential such that the lighting system is deenergized at a light intensity value less than the critical value by a degree that may be easily established by selecting the value of impedance 30.

Control apparatus embodying the principles of the present invention for operation from a 110-volt alternating current source may utilize a Type 5823 thyratron and a Type 7163 photocell with a relay having a 10,000 ohm coil which pulls in at 4 milliamperes. The circuit could also include a 1 mf. condenser for the condenser 23; a 1500 ohm resistor for the resistor 22; a 50,000 ohm resistor for the resistor 26; a 47,000 ohm resistor for the resistor 28; and a 1,000,000 ohm resistor for the resistor 30. It is to be expressly understood that the foregoing types of components and values of the condenser and the resistances are for the purpose of example only and in no way limit the scope of the invention as defined by the appended claims.

Although only one embodiment of the present invention has been disclosed and described herein, it is to be expressly understood that various changes and substitutions may be made therein without departing from the spirit of the invention as well understood by those skilled in the art. Reference therefor will be had to the appended claims for a definition of the limits of the invention.

What is claimed is:

1. A condition sensing apparatus comprising a discharge device having a cathode, an anode, and a control element, power supply means for the discharge device, a control element circuit including bias means to establish a predetermined state of the discharge device, means for supplying a signal to the control element in response to a condition to change the state of the discharge device, an impedance connected to the control element, and means responsive to the change in state of the discharge device to connect the impedance in a circuit with the anode of the discharge device.

2. Control apparatus comprising a discharge device having a cathode, an anode, and a control element, power supply means connected to the discharge device, a control element circuit including bias means to establish a predetermined state of the discharge device, a sensing device for supplying a signal to the control element in response to a condition to change the state of the discharge device, an impedance connected to the control element, output means, and means responsive to the change of state of the discharge device to connect the impedance in a circuit with the anode of the discharge device and to connect the output means to the power supply means.

3. Control apparatus comprising a discharge device having a cathode, an anode, and a control element, power supply means connected to the discharge device, bias means connected to the control element to establish a predetermined state of the discharge device, a sensing device for supplying a signal to the control element to change the state of the discharge device in response to a condition, an impedance connected to the control element, and means responsive to a change of state of the discharge device to connect the impedance in a circuit with the anode of the discharge device.

4. A photosensitive control system comprising a discharge device having cathode, anode, and control elements, voltage divider means to establish a predetermined state for the discharge device including a photosensitive device supplying a signal to the control element, power supply means for the voltage divider and discharge device, an impedance and output means connected to the cathode and control element, and means responsive to a change in state of the discharge device to connect the impedance to the anode of the discharge device and the output means to the power supply means.

5. A control system comprising a discharge device having a cathode, an anode and a control element, power supply means connected to the anode, a device to be controlled connected through a conductor and a switch to the power supply means, bias means fed from the power supply means and connected to the control element for biasing the discharge device, a sensing device for feeding a signal to the control element, an impedance connected to the control element and to the conductor, and switch operating means in the anode circuit of the discharge device.

6. A control system comprising a discharge device having a cathode, an anode and a control element, power supply means connected across the anode and the cathode, a voltage divider coupled to the control element and connected across the power supply means, a sensory device for feeding a signal to the control element, a device to be controlled having a connection to the cathode and a connection through a switch to the anode, current responsive means in the anode circuit for operating the switch, and an impedance connected to the control element and to the anode upon operation of the switch.

7. A control device as defined in claim 6 in which the voltage divider includes the sensory device.

References Cited in the file of this patent

UNITED STATES PATENTS

| 2,753,487 | Bone | July 3, 1956 |
| 2,773,220 | Aron | Dec. 4, 1956 |
| 2,818,529 | Jaffe et al. | Dec. 31, 1957 |
| 2,840,758 | Miller | June 24, 1958 |
| 2,921,232 | Machalek | Jan. 12, 1960 |